United States Patent
Wu et al.

(10) Patent No.: US 12,066,595 B2
(45) Date of Patent: *Aug. 20, 2024

(54) NANOENCAPSULATION METHODS FOR FORMING MULTILAYER THIN FILM STRUCTURES AND MULTILAYER THIN FILMS FORMED THEREFROM

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/319,369

(22) Filed: May 13, 2021

(65) Prior Publication Data

US 2021/0263196 A1    Aug. 26, 2021

Related U.S. Application Data

(63) Continuation of application No. 16/264,170, filed on Jan. 31, 2019, now Pat. No. 11,009,630.

(60) Provisional application No. 62/737,567, filed on Sep. 27, 2018.

(51) Int. Cl.
*G02B 1/14* (2015.01)
*B82Y 30/00* (2011.01)
*C09C 1/62* (2006.01)

(52) U.S. Cl.
CPC .................. *G02B 1/14* (2015.01); *C09C 1/62* (2013.01); *B82Y 30/00* (2013.01); *C01P 2006/42* (2013.01); *C01P 2006/60* (2013.01)

(58) Field of Classification Search
CPC .. G02B 1/14; C09C 1/62; B82Y 30/00; C01P 2006/42; C01P 2006/60
See application file for complete search history.

(56) References Cited

U.S. PATENT DOCUMENTS

| | | | |
|---|---|---|---|
| 5,167,988 A | 12/1992 | Yano et al. | |
| 6,103,599 A | 8/2000 | Henley et al. | |
| 9,559,295 B2 | 1/2017 | Han et al. | |
| 11,009,630 B2* | 5/2021 | Wu | G02B 1/14 |
| 2006/0263539 A1 | 11/2006 | Argoitia | |
| 2007/0178657 A1 | 8/2007 | Komuro et al. | |
| 2008/0241598 A1 | 10/2008 | Fukuzumi et al. | |
| 2009/0015771 A1* | 1/2009 | Hikmet | G02B 5/0236 264/1.36 |
| 2013/0265668 A1 | 10/2013 | Banerjee et al. | |
| 2014/0153139 A1 | 6/2014 | Takeo et al. | |
| 2015/0138642 A1* | 5/2015 | Banerjee | G02B 5/0825 359/584 |

(Continued)

*Primary Examiner* — Bijan Ahvazi
(74) *Attorney, Agent, or Firm* — Dinsmore & Shohl LLP

(57) ABSTRACT

A multilayer thin film structure having a reflective core particle, a dielectric layer directly encapsulating the reflective core particle, an absorber layer directly encapsulating the dielectric layer; an outer layer encapsulating the absorber layer. The multilayer thin film structure has a hue shift of less than 30° in the Lab color space when viewed at angles from 0° to 45°.

16 Claims, 17 Drawing Sheets

(56) References Cited

U.S. PATENT DOCUMENTS

2016/0204321 A1\* 7/2016 Naka ...................... H01L 33/44
                                                                                 257/98

\* cited by examiner

NANOENCAPSULATION METHODS FOR FORMING MULTILAYER THIN FILM STRUCTURES AND MULTILAYER THIN FILMS FORMED THEREFROM

CROSS REFERENCE TO RELATED APPLICATION

This application is a continuation of U.S. patent application Ser. No. 16/264,170 filed Jan. 31, 2019, which claims the benefit of priority under 35 U.S.C. § 119 of U.S. Provisional Application Ser. No. 62/737,567, filed on Sep. 27, 2018, all of which is incorporated herein by reference.

FIELD

The present application is related to methods for forming multilayer thin film structures and thin film structures formed therefrom, and in particular to nanoencapsulation methods for forming multilayer thin film structures and multilayer thin film structures formed therefrom.

BACKGROUND

Previously disclosed structural color multilayer thin film structures contain layers of metal oxides having a high refractive index and thin layers of metals as absorbers. Traditionally, these layers of thin films are deposited on a substrate by high vacuum deposition processes, such as physical vapor deposition (PVD) or sputtering. Once the layers have been deposited on the substrate, the substrate is removed, such as by using solvents that dissolve the substrate or by physically removing the deposited layers from the substrate. Subsequently, the multilayer thin film structure may be broken into discrete particles by mechanically pulverizing the multilayer thin film structure or by ultrasonic treatment.

The above-described process for forming multilayer thin film structures is both time consuming and costly. For example, maintaining the high vacuum required for the lengthy deposition process is difficult and can be expensive. In addition, the multilayer thin film structures generally must be deposited on the substrate layer-by-layer. Accordingly, for a seven layered thin film structure, the seven layers are deposited on the substrate in seven distinct deposition steps. This requires a significant amount of time, and depositing precise layers of different materials can be difficult and costly.

Accordingly, more efficient and cost-effective methods for forming multilayer thin film structures that provide omnidirectional structural color are desired.

SUMMARY

According to embodiments, a method for forming a multilayer thin film structure comprises: directly depositing an absorber layer to encapsulate a dielectric layer, wherein the dielectric layer encapsulates a reflective core particle; and depositing an outer layer to encapsulate the absorber layer, wherein the multilayer thin film structure has a hue shift of less than 30° in the Lab color space when viewed at angles from 0° to 45°.

According to embodiments, a multilayer thin film structure comprising: a reflective core particle; a dielectric layer directly encapsulating the reflective core layer; an absorber layer encapsulating directly encapsulating the dielectric layer; an outer layer encapsulating the absorber layer, wherein the multilayer thin film structure has a hue shift of less than 30° in the Lab color space when viewed at angles from 0° to 45°.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
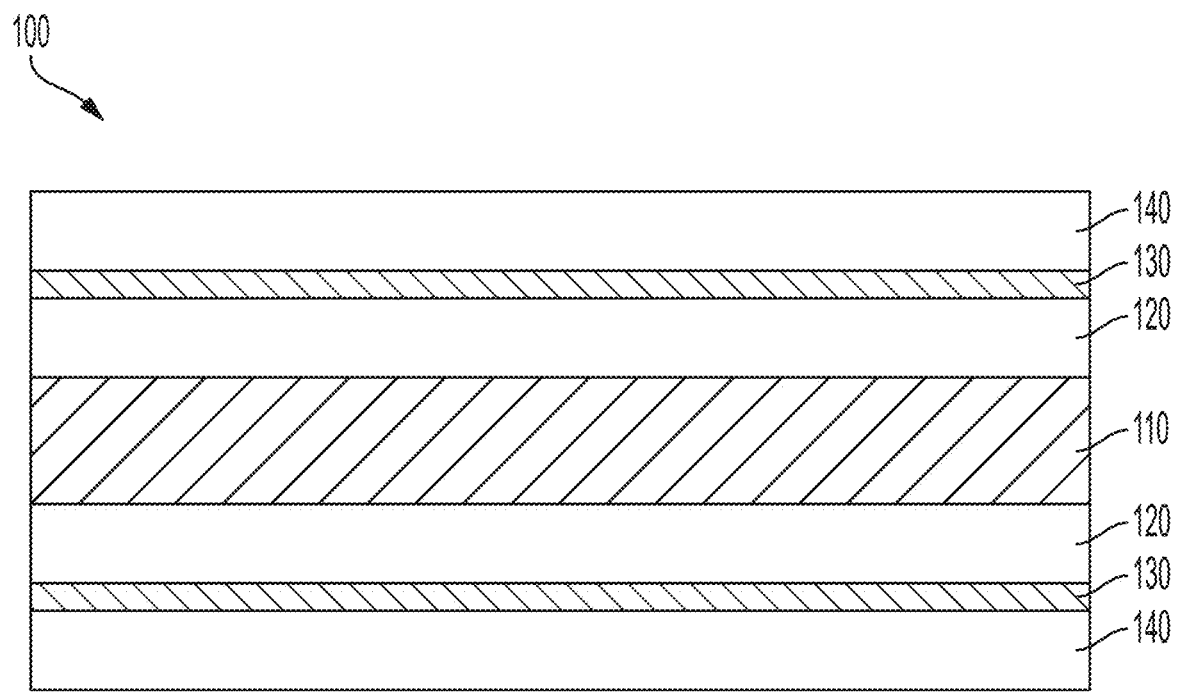
FIG. 1A schematically depicts a multilayer thin film structure.

In view of the high cost and lower efficiency involved in producing multilayer thin film structures described above, embodiments of nanoencapsulation methods for forming multilayer thin film structures disclosed and described herein are directed to methods that apply layers directly to the reflective core particle by nanoencapsulation of the reflective core—and any layers previously deposited thereon. Such methods significantly reduce the steps required for producing a multilayer thin film structure by reducing the number of deposition steps. For instance, with reference to FIG. 1A, a seven layer thin film structure 100 comprising a first outer layer 140, a first absorber layer 130, a first dielectric layer 120, a reflective core layer 110, a second dielectric layer 120, a second absorber layer 130, and a second outer layer 140 would require seven distinct deposition steps—one for each of the layers—to produce the seven layer thin film structure. In addition, the first layer to be deposited (one of the first or second outer layers 140) would be deposited on a sacrificial substrate. However, as can be seen in FIG. 1A, the seven layer thin film structure 100 comprises symmetrical layers on either side of the reflective core layer 110, such that the first and second dielectric layers 620 are made from the same material, the first and second metal layers 130 are made from the same material, and the first and second outer layers 140 are made from the same material. In embodiments disclosed and described herein, and with reference to FIG. 1B, by using nanoencapsulation methods for depositing the layers of the multilayer thin film structure 100, this process can be reduced to three steps: (1) depositing a dielectric layer 120 that encapsulates a reflective core particle 110 by nanoencapsulation; (2) depositing an absorber layer 130 that encapsulates the dielectric layer 120 by nanoencapsulation; and (3) depositing an outer layer 140 that encapsulates the metal layer 130 by nanoencapsulation.

Using this nanoencapsulation method for forming multilayer thin film structures reduces the number of deposition steps and time required to form a multilayer thin film structure can be significantly reduced. In addition, because the layers of the multilayer thin film are deposited directly onto a reflective core particle 110—as opposed to forming each layer of the multilayer thin film structure on a sacrificial substrate—no additional steps are required to remove the a sacrificial substrate or to mechanically or ultrasonically pulverize the formed multilayer thin film structure into pigment particles that can be used, for example, in paints, coatings, polymers, and the like. Accordingly, nanoencapsulation methods for forming multilayer thin film structures according to embodiments disclosed and described herein reduce the time and cost involved in forming multilayer thin film layers.

There are currently a number of different approaches to deposit layers of a multilayer thin film structure over a reflective core particle, which may be a discrete metal particle or flake. These different approaches include, for example, wet chemical processes, chemical vapor deposition (CVD), PVD, electroless plating processes, and atomic layer deposition (ALD) processes. Each of these deposition methods has strengths and weaknesses. For instance, some of the methods are cost effective, but it is difficult to deposit ultrathin layers (i.e., layers under 50 nm in thickness). Other deposition methods are better at depositing thin layers, but are costly, and it may still be difficult to deposit ultrathin layers of certain materials, such as metals. Accordingly, these deposition processes may be used individually or in differing combinations to deposit one or more of the layers of the multilayer thin film structure 100.

It will be understood that the terms "electromagnetic wave," "electromagnetic radiation," and "light," as used herein, may interchangeably refer to various wavelengths of light incidence on a multilayer thin film structure and that such light may have wavelengths in the ultraviolet (UV), infrared (IR), and visible portions of the electromagnetic spectrum.

Referring again now to FIG. 1B, a multilayer thin film 100 according to embodiments disclosed and described herein comprises: a reflective core particle 110; a dielectric layer 120 that encapsulates the reflective core particle 110; an absorber layer 130 that encapsulates the dielectric layer 130, and an outer layer 640 that encapsulates the absorber layer 130.

In embodiments, the location of absorbing layers may be chosen to increase the absorption of light wavelengths within a certain range, but reflect light in other wavelengths. For example, the location of an absorbing layer may be selected to have increased absorption, of light waves less than or equal to 550 nm, but reflect light waves of approximately 650 nm, such as visible light outside of the hue between 10° and 30°. Accordingly, the absorbing layer is placed at a thickness where the electric field ($|E|^2$) is less at the 550 nm wavelength than at the 650 nm wavelength. Mathematically, this can be expressed as:

$$|E_{550}|^2 << |E_{650}|^2 \tag{1}$$

and preferably:

$$|E_{650}|^2 \approx 0 \tag{2}$$

Figure 2:
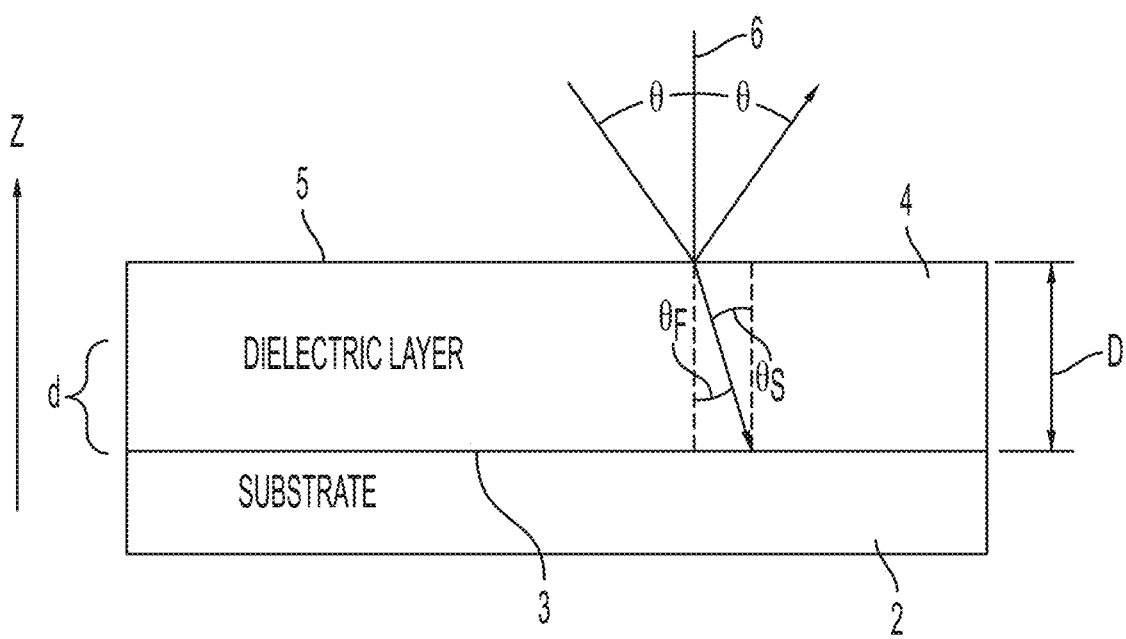
FIG. 2 depicts a multilayer thin film with a dielectric layer extending over a substrate layer and exposed to electromagnetic radiation at an angle θ relative to a normal direction to the outer surface of the dielectric layer.

FIG. 2 and the following discussion provide a method for calculating the thickness of a zero or near-zero electric field point at a given wavelength of light, according to embodiments. For the purposes of the present specification, the term "near-zero" is defined $|E|^2 \leq 10$. FIG. 2 illustrates a multilayer thin film with a dielectric layer 4 having a total thickness "D", an incremental thickness "d" and an index of refraction "n" on a substrate layer 2 having an index of refraction "$n_s$". The substrate layer 2 can be a core layer or a reflective core layer of a multilayer thin film. Incident light strikes the outer surface 5 of the dielectric layer 4 at angle $\theta$ relative to line 6, which is perpendicular to the outer surface 5, and reflects from the outer surface 5 at the same angle $\theta$. Incident light is transmitted through the outer surface 5 and into the dielectric layer 4 at an angle $\theta_F$ relative to the line 6 and strikes the surface 3 of substrate layer 2 at an angle $\theta_s$. For a single dielectric layer, $\theta_s=\theta_F$ and the energy/electric field (E) can be expressed as E(z) when z=d. From Maxwell's equations, the electric field can be expressed for s polarization as:

$$E^\omega(d) = \{u(z),0,0\} \exp(ik\alpha y)|_{z=d} \quad (3)$$

and for p polarization as:

$$E^\omega(d) = \left\{0, u(z), -\frac{\alpha}{\varepsilon(z)}v(z)\right\}\exp(ik\,\alpha y)|_{z=d} \quad (4)$$

where $$k = \frac{2\pi}{\lambda},$$

Figure 5:
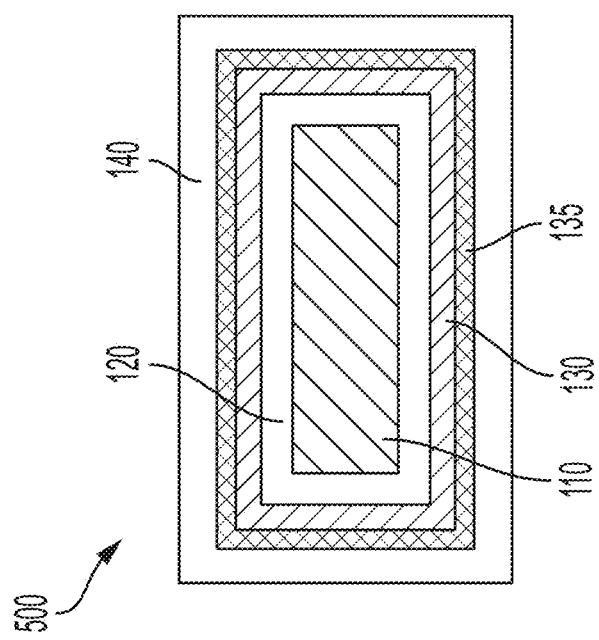
FIG. 5 is a schematic of a multilayer thin film structure comprising a protective layer according to embodiments disclosed and described herein.

$\lambda$ is a desired wavelength to be reflected, $\alpha = n_s \sin\theta_s$ where "s" corresponds to the substrate in FIG. 5, and $\varepsilon(z)$ is the permittivity of the layer as a function of z. As such:

$$|E(d)|^2 = |u(z)|^2 \exp(2ik\alpha y)|_{z=d} \quad (5)$$

for s polarization, and $$|E(d)|^2 = \left[|u(z)|^2 + \left|\frac{\alpha}{\sqrt{n}}v(z)\right|^2\right]\exp(2ik\,\alpha y)|_{z=d} \quad (6)$$

for p polarization.

It should be appreciated that variation of the electric field along the Z direction of the dielectric layer 4 can be estimated by calculation of the unknown parameters u(z) and v(z), where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix}\begin{pmatrix} u \\ v \end{pmatrix}_{z=0,\text{substrate}} \quad (7)$$

where 'i' is the square root of $-1$. Using the boundary conditions $u|_{z=0}=1$, $v|_{z=0}$, $q_s$, and the following relations:

$q_s = n_s \cos\theta_s$ for s-polarization (8)

$q_s = n_s/\cos\theta_s$ for p-polarization (9)

$q = n \cos\theta_F$ for s-polarization (10)

$q = n/\cos\theta_F$ for p-polarization (11)

$\varphi = k\cdot n\cdot d \cos(\theta_F)$ (12)

u(z) and v(z) can be expressed as:

$$u(z)|_{z=d} = u|_{z=0}\cos\varphi + v|_{z=0}\left(\frac{i}{q}\sin\varphi\right) = \cos\varphi + \frac{iq_s}{q}\sin\varphi \quad (13)$$

and $$v(z)|_{z=d} = iqu|_{z=0}\sin\varphi + v|_{z=0}\cos\varphi = iq\sin\varphi + q_s\cos\varphi \quad (14)$$

Therefore:

$$|E(d)|^2 = \left[\cos^2\varphi + \frac{q_s^2}{q^2}\sin^2\varphi\right]e^{2ik\alpha y} = \left[\cos^2\varphi + \frac{n_s^2}{n^2}\sin^2\varphi\right]e^{2ik\alpha y} \quad (15)$$

for s polarization with $\varphi = k\cdot n\cdot d \cos(\theta_F)$, and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] \quad (16)$$

$$= \left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s\sin\theta_s = n\sin\theta_F \quad (17)$$

$$q_s = \frac{n_s}{\cos\theta_s} \quad (18)$$

$$q_s = \frac{n}{\cos\theta_F} \quad (19)$$

and

Thus for a simple situation where $\theta_F=0$ or normal incidence, $\varphi = k\cdot n\cdot d$, and $\alpha = 0$: $|E(d)|^2$ for s-polarization$=|E(d)|^2$ for p-polarization=

$$\left[\cos^2\varphi + \frac{n_s^2}{n^2}\sin^2\varphi\right] \quad (20)$$

$$= \left[\cos^2(k\cdot n\cdot d) + \frac{n_s^2}{n^2}\sin^2(k\cdot n\cdot d)\right] \quad (21)$$

which allows for the thickness "d" to be solved for (i.e., the position or location within the dielectric layer where the electric field is zero). It should be appreciated that the thickness "d" can also be the thickness of the outer layer 640 extending over the third layer 630 that provides a zero or near zero electric field at the interface between the outer layer and the third layer 630. It should also be appreciated that the above equations can be tailored to absorb and reflect light in other wavelengths.

Figure 3A:
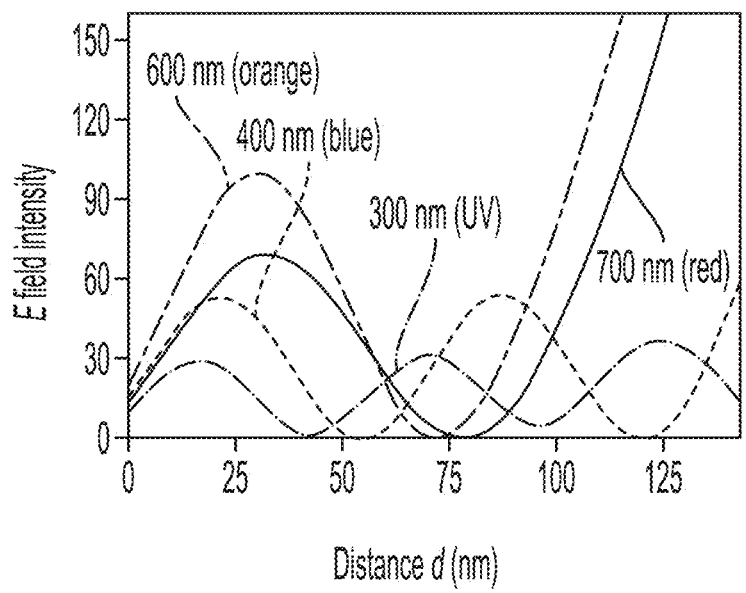
FIG. 3A is a graph showing electric field intensity versus distance in nm for various wavelengths of electromagnetic radiation.
Figure 3B:
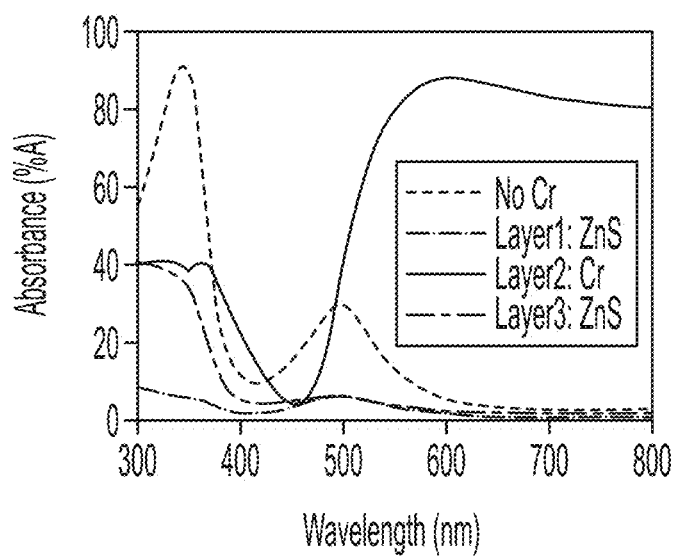
FIG. 3B is a graph showing absorbance versus wavelength for structures comprising a Cr absorber and structures not comprising a Cr absorber.
Figure 3C:
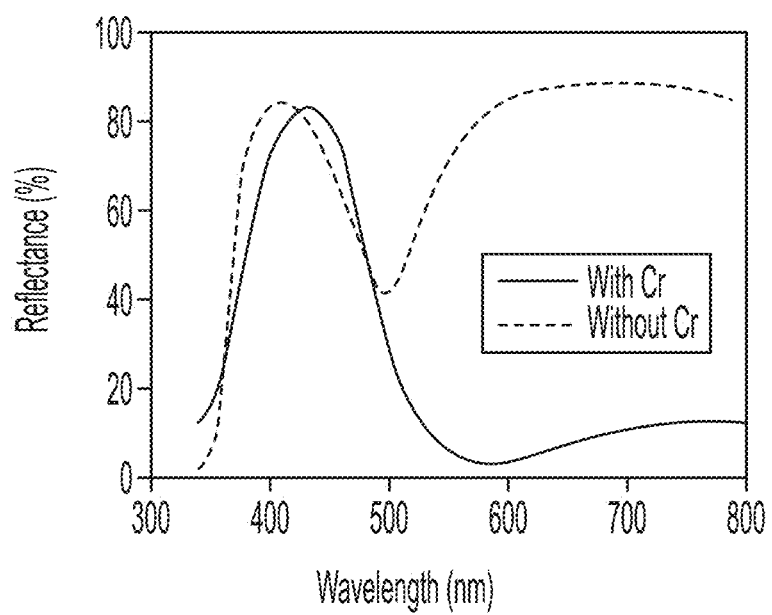
FIG. 3C is a graph showing reflectance versus wavelength for structures comprising a Cr absorber and structures not comprising a Cr absorber.

With reference again to FIG. 1A, an exemplary multilayer thin film structure 110 may comprise an aluminum reflective core layer 110, a zinc sulfide (ZnS) dielectric layer 120 across the reflective core layer 110, a chromium (Cr) absorber layer 130 across the dielectric layer 120, and a ZnS outer layer 140 across the absorber layer 130. Calculated electric field intensity along the dielectric layer thickness for this structure is shown in FIG. 3A for various wavelengths. FIG. 3A shows the presence of near zero energy or $|E|_{d=d_0}=0$ at some locations. For a specific wavelength $\lambda$, when a thin absorber layer is placed at this point ($d_0$) the thin absorber layer does not absorb any electromagnetic radiation at that wavelength, but the thin absorber layer located at this point ($d_0$) does absorb electromagnetic radiation at other wavelengths that do not have near zero energy at this point ($d_0$). As an example, and with reference to FIG. 3A, at a wavelength of 434 nm, which corresponds to a blue color), a location of a thin metal absorber layer may be selected so that $|E|_{d=d_0}=0$ and the electromagnetic radiation at 434 nm (such as blue light) is not absorbed by the thin metal absorber layer and is transmitted, but electromagnetic radiation having a non-zero E field at this location will be absorbed by the thin metal absorber layer. As shown in FIG. 3B, strong absorbance of electromagnetic radiation in the orange to red light emitting range (i.e., 450 nm to 700 nm) shows the successful application of this absorbing principle. As a result of using a thin Cr absorbing layer at the requisite position, the reflectance spectra shown in FIG. 3C is achieved. The reflectance spectra in FIG. 3C shows a strong, singular peak of electromagnetic radiation reflectance at wavelengths from around 350 nm to around 500 nm, which is blue light emitting electromagnetic radiation. This strong, singular reflectance of blue emitting light is achieved, in part, by absorbing electromagnetic radiation at wavelengths from 450 nm to 700 nm with a thin Cr absorber layer.

Using metal layers, such as the aluminum core reflective layer and chromium absorber layer in a multilayer thin film structure provides optical effects similar to a thirty one layer thin film structure using only dielectric layers. It was also found that by strategically using metal layers in the multilayer thin film structure, a seven layer thin film structure could be made to have a hue shift in the Lab color space similar to that of a thin film having thirty one dielectric layers. In particular, seven layer thin film structures having a hue shift of less than 30°, in the Lab color space when viewed at angles from 0° to 45° can be achieved. Thus, using metal materials as layers in multilayer thin film structures significantly decreases the production time, cost, and efficiency by only requiring deposition of seven layers as opposed to thirty one layers.

Figure 4:
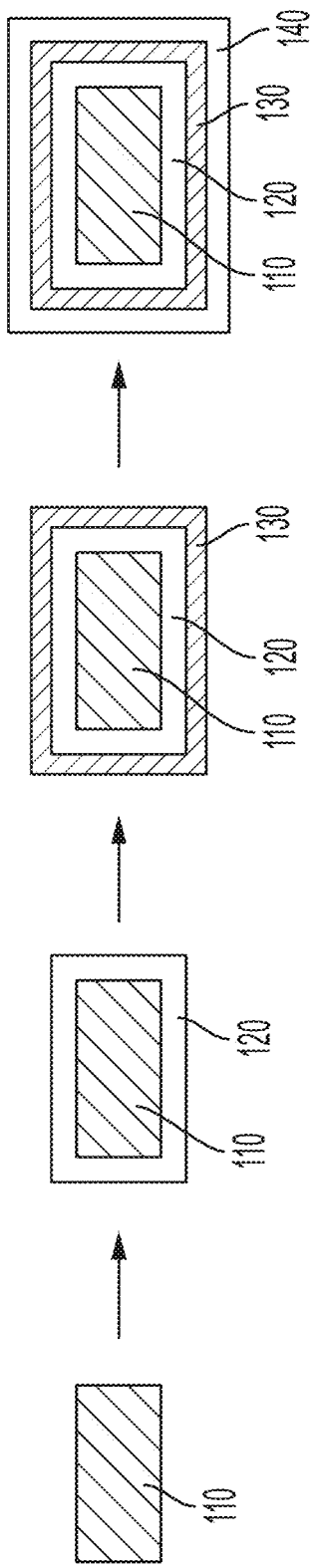
FIG. 4 is a schematic flow chart of methods for forming multilayer thin film structures according to embodiments disclosed and described herein.

Nanoencapsulation methods for forming multilayer thin film structures according to embodiments will now be described with reference to FIG. 4. While the embodiments depicted in FIG. 4 are directed to forming a seven layer thin film structure, it should be understood that nanoencapsulation methods disclosed and described herein can be used to form multilayer thin films having any number of desired layers. Nanoencapsulation methods for forming multilayer thin film structures according to embodiments begin with a reflective core particle 110. This reflective core particle may be a discrete particle having any shape. In embodiments, the reflective core particle 110 can have a thickness from 10 nanometers (nm) to 5000 nm (i.e., 5 microns (µm)), such as from 50 nm to 1000 nm, from 100 nm to 600 nm, from 125 nm to 400 nm, from 150 nm to 300 nm, or from 175 nm to 250 nm. In embodiments, the reflective core particle 110 can have a length from 5 µm to 100 µm, such as from 10 µm to 50 µm, or from 20 µm to 30 µm. In embodiments, the reflective core particle 110 can at least one of a "gray metallic" material, such as Al, Ag, Pt, Sn; at least one of a "colorful metallic" material, such as Au, Cu, brass, bronze, TiN, Cr, or a combination thereof.

The first nanoencapsulation step for forming multilayer thin film structures comprises forming a dielectric layer 120 that directly encapsulates the reflective core particle 110. The dielectric layer 120 may be deposited on the reflective core particle 110 by any suitable method, such as, for example, CVD, ALD, wet chemical processes, and PVD. The dielectric layer 120 can, according to embodiments, have a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. In some embodiments, the dielectric layer 120 can have a thickness from 5 nm to 450 nm, such as from 5 nm to 400 nm, from 5 nm to 350 nm, from 5 nm to 300 nm, from 5 nm to 250 nm, from 5 nm to 200 nm, from 5 nm to 150 nm, from 5 nm to 100 nm, or from 5 nm to 50 nm. In embodiments, the dielectric layer 120 can have a thickness from 50 nm to 450 nm, such as from 100 nm to 400 nm, from 150 nm to 350 nm, or from 200 nm to 300 nm. In embodiments, the dielectric layer 120 can be made from at least one colorful dielectric material such as $Fe_2O_3$, TiN, or a combination thereof. In other embodiments, the dielectric layer 120 may be a dielectric material selected from the group consisting of ZnS, $ZrO_2$, $CeO_2$ $HfO_2$, $TiO_2$, or combinations thereof. According to some embodiments, the dielectric layer 120 may be selected from ZnS, $Fe_2O_3$, $TiO_2$, or combinations thereof. In embodiments, the dielectric layer 120 is comprised of one or more metal oxides. It should be understood that commercially available metal particles coated with a dielectric layer may be used in place of the first nanoencapsulation step.

The second nanoencapsulation step according to embodiments for forming a multilayer thin film structure comprises depositing an absorber layer 130 that directly encapsulates the dielectric layer 120 (and in turn indirectly encapsulates the reflective core particle 110). The absorber layer 130 may be deposited on the dielectric layer by any suitable method, such as ALD, PVD. CVD, or wet chemical processes. The absorber layer 130 can, in embodiments, have a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, or from 15 nm to 20 nm. In embodiments, the absorber layer 130 can have a thickness from 5 nm to 15 nm, such as from 5 nm to 10 nm, or from 10 nm to 15 nm. In embodiments, the absorber layer 130 can be made from at least one material selected from W, Cr, Ge, Ni, stainless steel, Pd, Ti, Si, V, TiN, Co, Mo, Nb, ferric oxide, amorphous silicon, or combinations thereof. In embodiments, the absorber layer 130 is comprised of one or more metals.

The third nanoencapsulation step according to embodiments for forming a multilayer thin film structure comprises depositing an outer layer 140 that directly encapsulates the absorber layer 130 (and in turn indirectly encapsulates the dielectric layer 120 and the reflective core particle 110). The outer layer 140 may be deposited by any suitable method, such as, for example, CVD, ALD, wet chemical processes, and PVD. The outer layer 140 can, in embodiments, have a thickness greater than 0.1 quarter wave (QW) to less than or equal to 4.0 QW where the control wavelength is determined by the target wavelength at the peak reflectance in the visible wavelength, such as between 0.5 QW and 4.0 QW, between 1.0 QW and 4.0 QW, between 1.5 QW and 4.0 QW, between 2.0 QW and 4.0 QW, between 2.5 QW and 4.0 QW, between 3.0 QW and 4.0 QW, or between 3.5 QW and 4.0 QW. In embodiments, the outer layer 140 can have a thickness from greater than 0.1 QW to less than 3.5 QW, such as from greater than 0.1 QW to less than 3.0 QW, from greater than 0.1 QW to less than 2.5 QW, from greater than 0.1 QW to less than 2.0 QW, from greater than 0.1 QW to less than 1.5 QW, from greater than 0.1 QW to less than 1.0 QW, or from greater than 0.1 QW to less than 0.5 QW. In some embodiments, the outer layer 140 can have a thickness from 0.5 QW to 3.5 QW, such as from 1.0 QW to 3.0 QW, or from 1.5 QW to 2.5 QW. In embodiments, the target wavelength may be about 1050 nm. The outer layer 140 can be made from a dielectric material with a refractive index greater than 1.6 such as ZnS, $ZrO_2$, $CeO_2$ $HfO_2$, $TiO_2$, or combinations thereof. In some embodiments, the outer layer can be made from $Fe_2O_3$. In embodiments, the outer layer is comprised of metal oxides.

In embodiments it may be beneficial if all of the layers of the multilayer thin film structure (which may comprise metal oxides and metals) are deposited directly over the reflective core particle by the same process. Accordingly, in some embodiments for forming multilayer thin film structures, the three nanoencapsulation steps described above may be conducted by a single process, such as where all three nanoencapsulation steps are conducted by ALD or PVD. However, in other embodiments, the three nanoencapsulation steps described above may be conducted by different processes, such as where the first nanoencapsulation step is conducted by, for example, CVD, the second nanoencapsulation step is conducted by, for example, ALD, and the third nanoencapsulation step is conducted by PVD. It should be understood that in embodiments where different deposition processes are conducted for the nanoencapsulation steps, any combination of deposition processes may be used in the nanoencapsulation steps for forming a multilayer thin film structure.

According to embodiments, a multilayer thin film structure may comprise an aluminum reflective core particle 110, a dielectric layer 120 comprising $TiO_2$ (rutile phase or anatase phase) directly encapsulating the reflective core particle 110, a W or Cr absorber layer 130 directly encapsulating the dielectric layer 120, and a $TiO_2$ (rutile phase and anatase phase) outer layer 140 directly encapsulating the absorber layer 130. In embodiments, the absorber layer 130 may be W. By changing the layer thickness and, thereby, absorber position, the multilayer thin film structure can reflect a variety of electromagnetic radiation within the visible spectrum.

According to some embodiments, a multilayer thin film structure may comprise an aluminum reflective core particle 110, a dielectric layer 120 comprising $Fe_2O_3$ (hematite) directly encapsulating the reflective core particle 110, a W or Cr absorber layer 130 directly encapsulating the dielectric layer 120, and a $TiO_2$ (rutile phase and anatase phase) outer layer 140 directly encapsulating the absorber layer 130. In embodiments, the absorber layer 130 may be W. This structure is particularly directed to reflecting electromagnetic radiation at wavelengths at or around 700 nm (near red light emitting electromagnetic radiation). Compared to other colors (such as blue, green, or yellow) the available range of hue space is much narrower for red color. Because of this, the angular sensitivity requirement for red-colored multilayer thin film structures is much tighter and more challenging than for other colors. Thus, multilayer thin film structures designed to reflect electromagnetic radiation in the wavelength band that emits red require not only a "selective" absorber, such as $Fe_2O_3$ to reduce the angular sensitivity, but precise control of all the layers that are stacked into the multilayer thin film structure is also maintained.

With reference again to FIG. 1B, the layers used to form a multilayer thin film structure 100 that provides omnidirectional structural color for black may, according to embodiments, comprise: a reflective core particle 110, such as Al; a dielectric layer 120 made from $Fe_2O_3$ that directly encapsulates the reflective core particle 110; an absorber layer 130 made from W that directly encapsulates the dielectric layer 120 (and thereby encapsulates the reflective core particle 110); and an outer layer 140 made from $Fe_2O_3$ that directly encapsulates the absorber layer 130 (and thereby encapsulates the dielectric layer 120 and the reflective core particle 110). However, deposition of the outer layer 140, which is made from $Fe_2O_3$, by CVD or ALD generally comprises an oxidative agent, such as, for example ozone, that oxidizes underlying absorber layer 130. If a significant portion of the absorber layer 130 is oxidized, such as by forming $WO_x$, the absorber layer 130 may not function properly. Accordingly, in embodiments, steps are taken to prevent oxidation of the absorber layer 130.

An embodiment of a multilayer thin film structure that prevents oxidation of the absorber layer is provided with reference to FIG. 5. The multilayer thin film structure 500 according to embodiments shown in FIG. 5 may be considered as a nine layer thin film structure and comprise: a reflective core particle 110; a dielectric layer 120 made from $Fe_2O_3$ that directly encapsulates the reflective core particle; an absorber layer 130 made from W that directly encapsulates the dielectric layer 120 (and thereby indirectly encapsulates the reflective core particle 110); a protective layer 135 made from $Al_2O_3$ or $SiO_2$ that directly encapsulates the absorber layer 130 (and thereby indirectly encapsulates the dielectric layer 120 and the reflective core particle 110); and an outer layer 140 that directly encapsulates the protective layer 135 (and thereby indirectly encapsulates the absorber layer 130, the dielectric layer 120, and the reflective core particle 110).

In embodiments, the reflective core particle 110, the dielectric layer 120, the absorber layer 130, and the outer layer 140 may have the properties (e.g., thickness, length, etc.) of the corresponding components disclosed above, and the dielectric layer 120, the absorber layer 130, and the outer layer 140 may be formed by any of the methods disclosed above. In embodiments, protective layer 135 may be deposited on the absorber layer 130 by any suitable method, such as ALD, CVD, wet chemical processes, or PVD. The protective layer 135 can, in embodiments, have a thickness from greater than 0 nm to 50 nm, such as from 1 nm to 40 nm, from 2 nm to 30 nm, from 3 nm to 20 nm, from 4 nm to 20 nm, from 5 nm to 20 nm, from 10 nm to 20 nm, or from 15 nm to 20 nm. In embodiments, the protective layer 135 can have a thickness from 5 nm to 15 nm, such as from 5 nm to 10 nm, or from 10 nm to 15 nm. In embodiments, the protective layer 135 can be made from at least one material selected from $Al_2O_3$ or $SiO_2$. In embodiments, the protective layer 135 is comprised of $Al_2O_3$. A protective layer as described herein will, in embodiments, prevent the absorber layer 130 from oxidizing when an outer layer 140 made from, for example. $Fe_2O_3$ is deposited on the multilayer thin film structure.

Embodiments of the multilayer thin film structures 100 and 500 described above have a hue shift of less than 30°, such as less than 25°, less than 20°, less than 15°, or less than 10° in the Lab color space when viewed at angles from 0° to 45°.

Figure 1B:
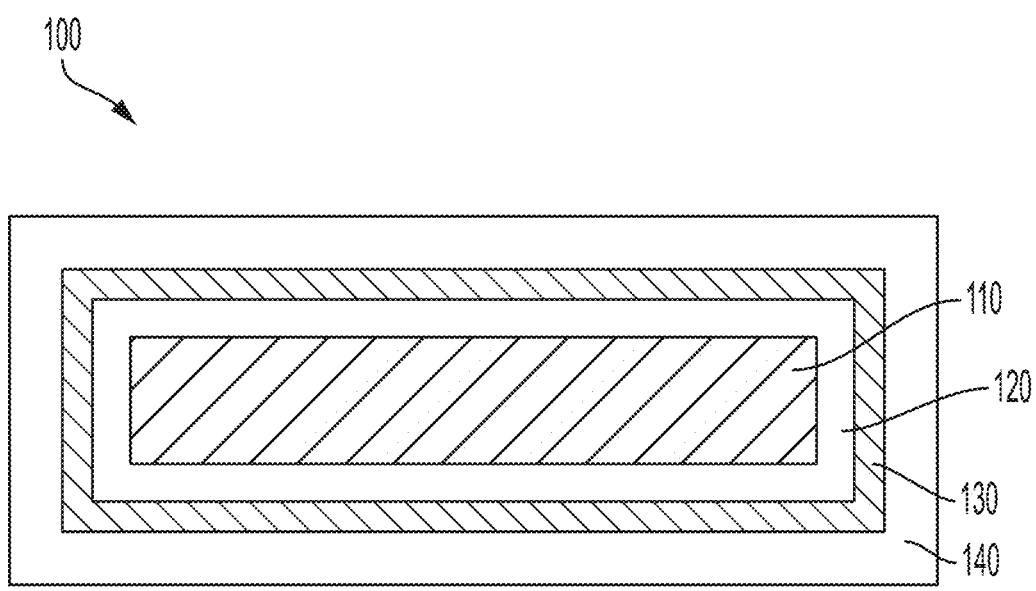
FIG. 1B schematically depicts a multilayer thin film structure according to embodiments disclosed and described herein.

With reference to FIG. 1B, in one or more embodiments, the multilayer thin film 100 comprises a reflective core particle 110 made from Al metallic material, a dielectric layer 120 made from $Fe_2O_3$ that directly encapsulates the reflective core particle 110, an absorber layer 130 made from W directly encapsulating the dielectric layer 120, and an outer layer 140 made from $TiO_2$ directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from $TiO_2$ that directly encapsulates the reflective core particle 110, an absorber layer 130 made from W directly encapsulating the dielectric layer 120, and an outer layer 140 made from $TiO_2$ directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from $Fe_2O_3$ that directly encapsulates the reflective core particle 110, an absorber layer 130 made from W directly encapsulating the dielectric layer 120, and an outer layer 140 made from $Fe_2O_3$ directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from $TiO_2$ that directly encapsulates the reflective core particle 110, an absorber layer 130 made from W directly encapsulating the dielectric layer 120, and an outer layer 140 made from $TiO_2$ directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from ZnS that directly encapsulates the reflective core particle 110, an absorber layer 130 made from Cr directly encapsulating the dielectric layer 120, and an outer layer 140 made from ZnS directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from $Fe_2O_3$ that directly encapsulates the reflective core particle 110, an absorber layer 130 made from Cr directly encapsulating the dielectric layer 120, and an outer layer 140 made from ZnS directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 1B, in one or more embodiments, the multilayer thin film 100 comprises a reflective core particle 110 made from Al metallic material, a dielectric absorber layer 120 made from $Fe_2O_3$ that directly encapsulates the reflective core particle 110, an absorber layer 130 made from Cr directly encapsulating the dielectric layer 120, and an outer layer 140 made from $TiO_2$ directly encapsulating the absorber layer 130. This multilayer thin film 100 has a hue shift of less than 30°, such as less than 25°, less than 20°, less than 15°, or less than 10° in the Lab color space when viewed at angles from 0° to 45°.

With reference to FIG. 5, in one or more embodiments, the multilayer thin film 500 comprises a reflective core particle 110 made from Al metallic material, a dielectric absorber layer 120 made from $Fe_2O_3$ that directly encapsulates the reflective core particle 110, an absorber layer 130 made from W directly encapsulating the dielectric layer 120, a protective layer 135 made from $Al_2O_3$ directly encapsulating the absorber layer 130, and an outer layer 140 made from $Fe_2O_3$ directly encapsulating the protective layer 135. This multilayer thin film 500 has a hue shift of less than 30°, such as less than 25°, less than 20°, less than 15°, or less than 10° in the Lab color space when viewed at angles from 0° to 45°.

With reference to FIG. 5, in one or more embodiments, the multilayer thin film 500 comprises a reflective core particle 110 made from Al metallic material, a dielectric absorber layer 120 made from $Fe_2O_3$ that directly encapsulates the reflective core particle 110, an absorber layer 130 made from W directly encapsulating the dielectric layer 120, a protective layer 135 made from $SiO_2$ directly encapsulating the absorber layer 130, and an outer layer 140 made from $Fe_2O_3$ directly encapsulating the protective layer 135. This multilayer thin film 500 has a hue shift of less than 30°, such as less than 25°, less than 20°, less than 15°, or less than 10° in the Lab color space when viewed at angles from 0° to 45°.

According to embodiments, multilayer thin film structures disclosed and described herein may be used in paints, polymers, polymers or coatings. In embodiments, the multilayer thin film structures described herein may be incorporated into a liquid carrier, such as an organic or inorganic binder, and utilized in a paint or similar coating system which may be applied to an article of manufacture, thereby imparting the omnidirectional reflectivity properties of the multilayer thin film structure to the article. In some embodiments, multilayer thin film structure may be dispersed in a polymer matrix such that the multilayer thin film structures are randomly oriented in the matrix. Thereafter, the paint, coating, or polymer comprising the multilayer thin film structure may be deposited on an article of manufacture by spraying, electrostatic charging, powder coating, and the like. The deposited coating thereby imparting the reflectance or shimmer of the metallic component or the omnidirectional reflectivity properties of the multilayer thin film structure to the article to which it is applied.

According to embodiments, at least one of paint binders and fillers can be used and mixed with the pigments to provide a paint that displays an omnidirectional structural color. In addition, other additives may be added to the multilayer thin film to aid the compatibility of multilayer thin film in the paint system. Exemplary compatibility-enhancing additives include silane surface treatments that coat the exterior of the multilayer thin film and improve the compatibility of multilayer thin film in the paint system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

EXAMPLES

Embodiments will be further clarified by the following examples.

Example 1

Figure 6A:
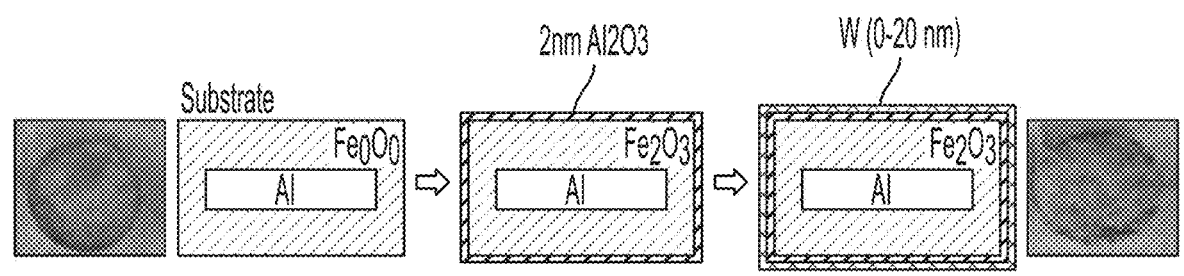
FIG. 6A is a photograph showing the change in color of multilayer thin film structures as a function of tungsten deposition cycles.
Figure 6B:
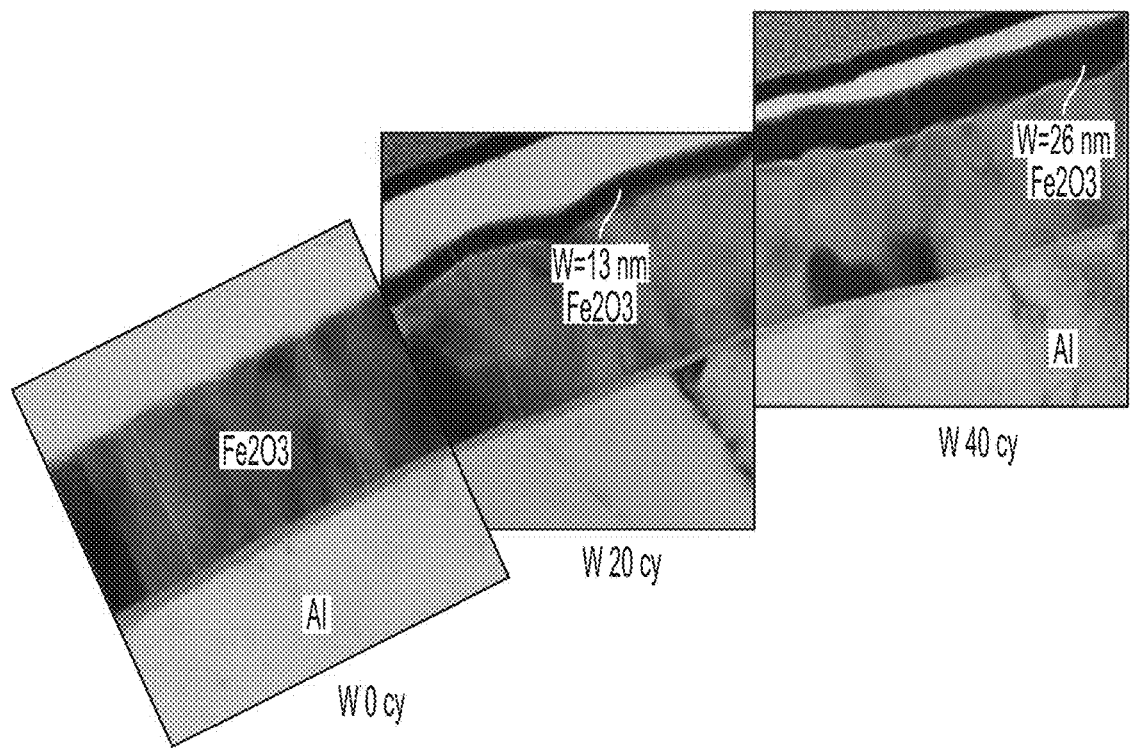
FIG. 6B is a magnified view of a tungsten layer deposited on reflective core particle coated with iron oxide.
Figure 6C:
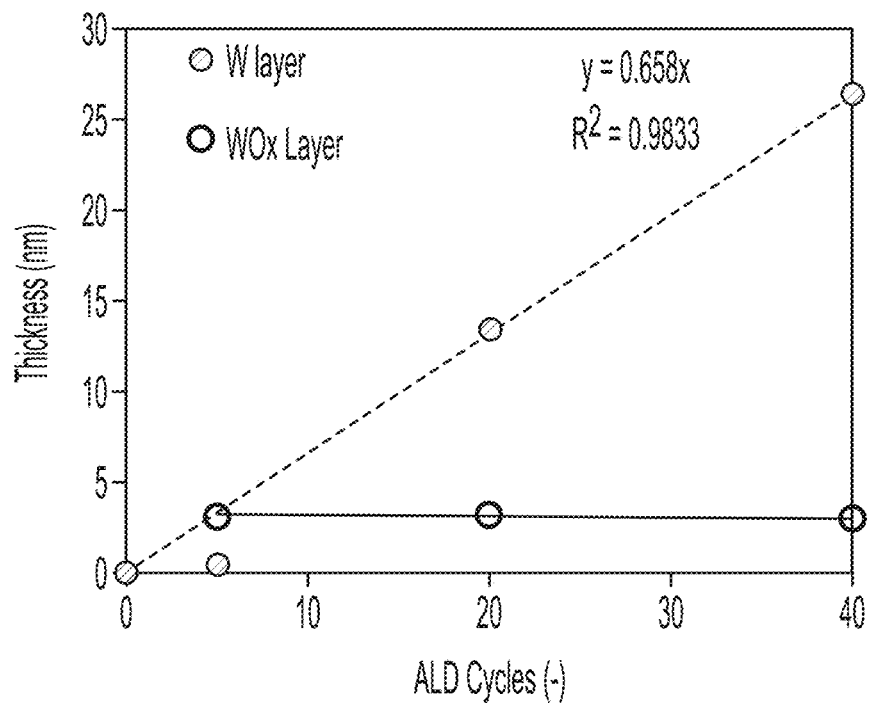
FIG. 6C is a graph showing the thickness of a tungsten layer versus atomic layer deposition cycle.
Figure 6D:
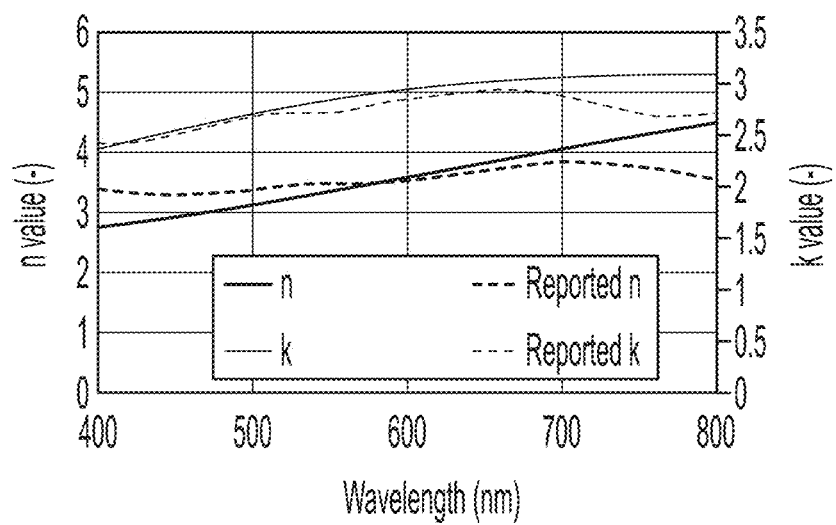
FIG. 6D is a graph showing n values and k values versus wavelength of electromagnetic radiation.

A nanoencapsulation method for forming a seven layer thin film structure that provides omnidirectional structural color red pigments is provided. In this example, ALD was chosen for deposition of the absorber layer, which is formed from a metal, and the outer layer, which is formed from a metal oxide, due to the advantages of ALD, such as accurate thickness control, low temperature process, capability of continuous conformal coating. The metal material chosen for the absorber layer is W (tungsten) due to availability of the ALD precursors, and the metal oxide material chosen for the outer layer is $TiO_2$ (titanium oxide). Commercially available $Fe_2O_3$ (iron oxide) coated aluminum (Al) flake pigments are used as substrates. The iron oxide is deposited on the Al reflective core particle using CVD and the results are summarized below FIG. 6A shows original pigment flakes (Al reflective core layer encapsulated by an $Fe_2O_3$ dielectric layer) subject to different ALD cycles of W ranging from 0 to 40 cycles. As the number of ALD cycles of W increases, the color of the resulting pigment changes from its original red to purple and eventually turns dark grey at 40 cycles. The thickness of the deposited layer under different cycles is shown in FIG. 6B and summarized in FIG. 6C. These figures clearly show that the W metal layer is continuously deposited over the $Fe_2O_3$ dielectric layer, and the thickness of the W metal layer is proportional to the cycle number, indicating that ALD can perform precise control of single element deposition, while a thin $WO_x$ layer stays nearly at about 3 nm independent of cycle numbers. Without being bound to any particular theory, this is possibly due to passivation. Growth rate of the ALD deposited W metal layer is about 13 nm/hr or 0.66 nm/cycle. FIG. 6D shows the matched optical property (refractive index n and extinction coefficient k) of the deposited W metal layer with data reported over 400 to 800 nm.

Figure 7A:
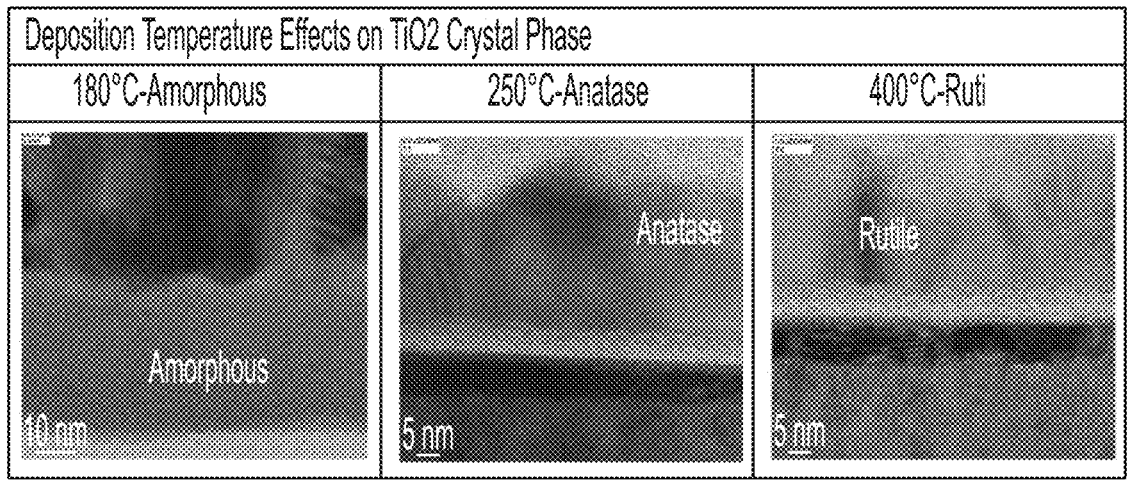
FIG. 7A is a series of magnified photographs of crystalline titanium dioxide layers deposited as layers of multilayer thin film structures.
Figure 7B:
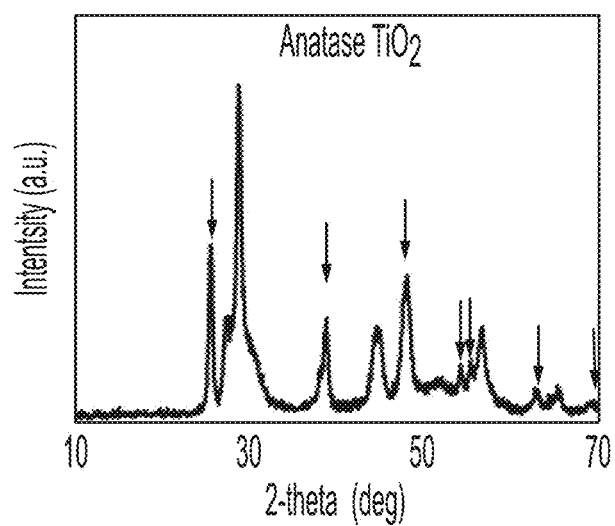
FIG. 7B is a spectra of anatase titanium dioxide deposited as layers of multilayer thin film structures.
Figure 7C:
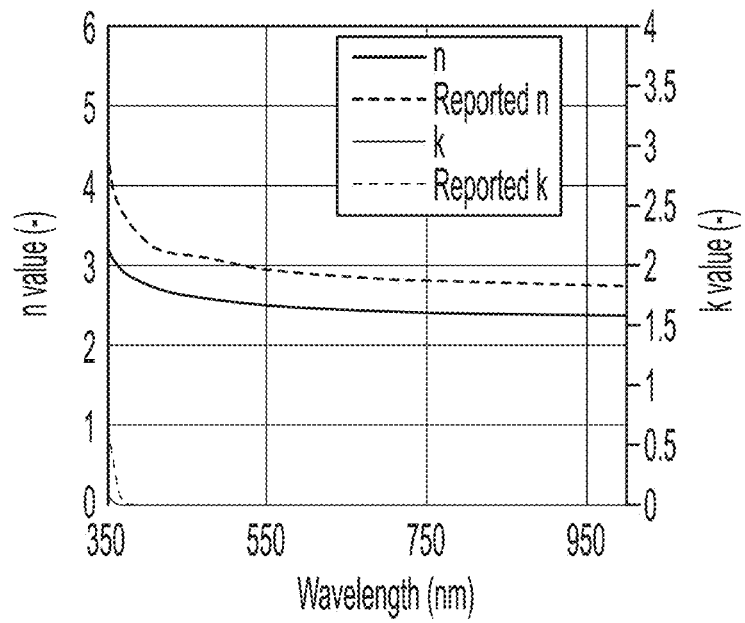
FIG. 7C is a graph showing n values and k values versus wavelength of electromagnetic radiation.
Figure 7D:
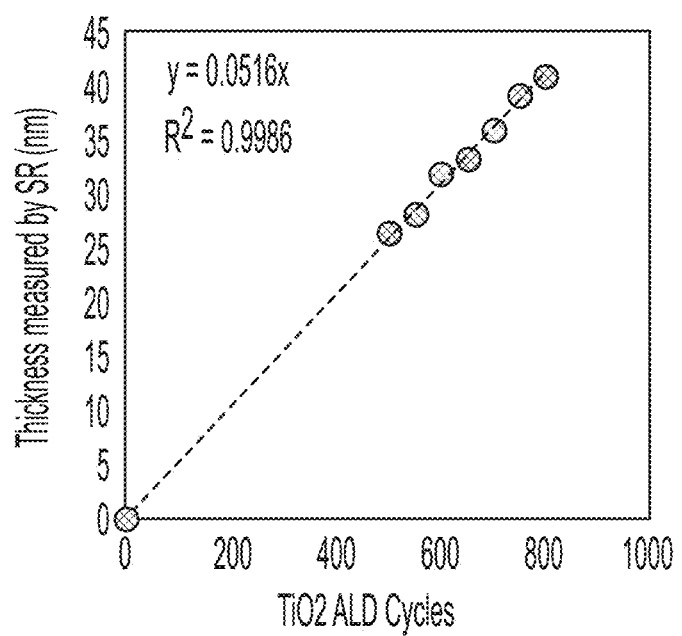
FIG. 7D is a graph showing thickness of titanium dioxide versus the atomic layer deposition cycle.

ALD was also used in this example to deposit a well-controlled $TiO_2$ outer layer with high refractive index encapsulating the W metal layer (and thereby encapsulating the $Fe_2O_3$ dielectric layer and the Al reflective core particle). A crystalline phase of a $TiO_2$ formed layer can be controlled by ALD process parameters such as temperature. FIG. 7A shows the temperature effects on the crystalline phase changing from amorphous to anatase and later rutile, with increased temperature from 180° C. to 400° C., while other processes such as wet-chemical method usually require over 700° C. to achieve necessary crystalline phase. Anatase phase was chosen for this example due to the relatively mild process temperature required (250° C.). The lattice fringes of the deposited layer in the middle HRTEM of FIG. 7A and the representative peaks indicated by red arrows in the XPS spectra shown in FIG. 7B clearly show the formation of the anatase phase. FIG. 7C shows the matched optical property (refractive index n and extinction coefficient k) of the deposited layer with reported data over 350 to 1000 nm. FIG. 7D further shows the thickness is proportional to the cycle number with growth rate of about 0.052 nm/cycle, indicating ALD can perform precise control of $TiO_2$ layer.

The above confirms precise control of nanometer scale layers of metals and metal oxides can be deposited by ALD. Below we utilize ALD to create a multilayer thin film structure that provides red omnidirectional structural color and no compatibility issues have been identified among deposited layers or between deposited materials and substrates.

Figure 8A:
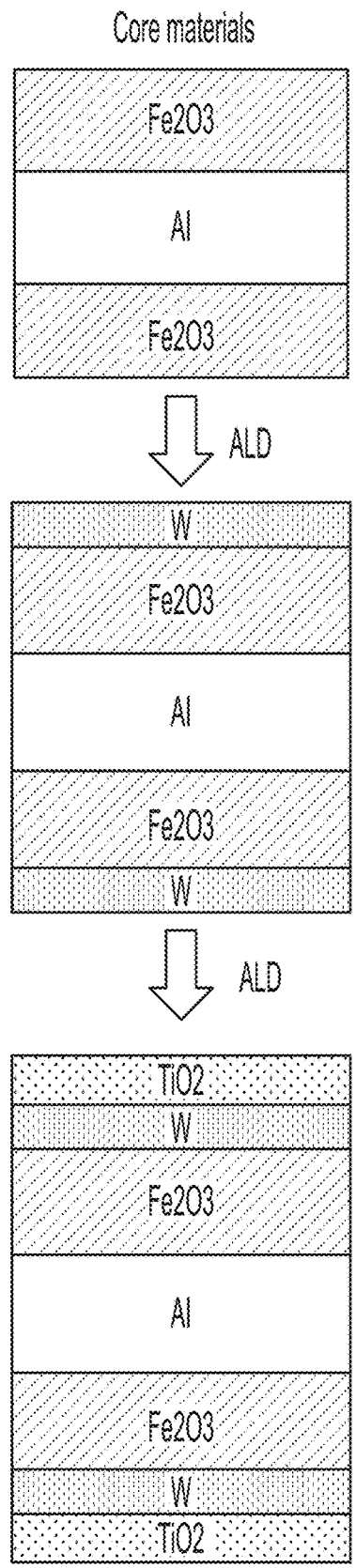
FIG. 8A is a schematic showing processes for forming multilayer thin film structures according to embodiments disclosed and described herein.
Figure 8B:
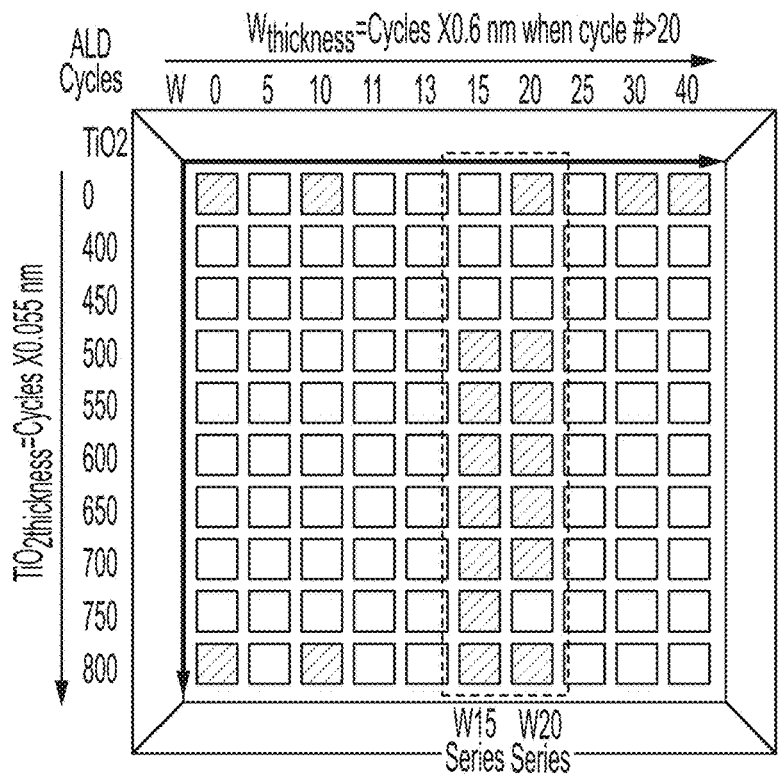
FIG. 8B is a matrix of tungsten and titanium dioxide thickness as a function of atomic layer deposition cycles.
Figure 8C:
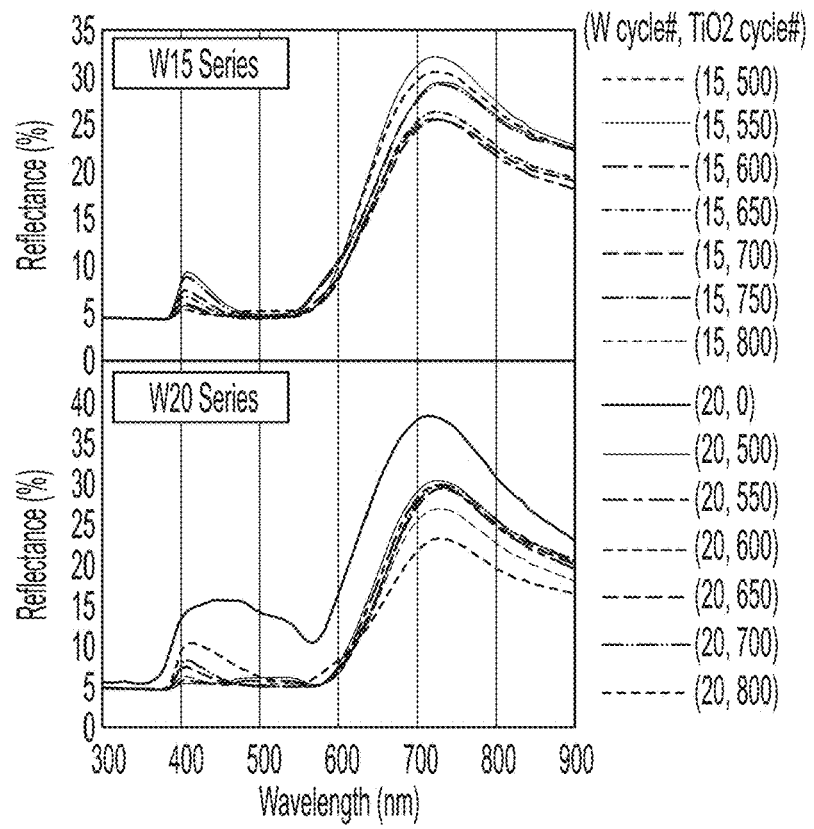
FIG. 8C is a graph showing reflectance versus wavelength for structures.
Figure 8D:
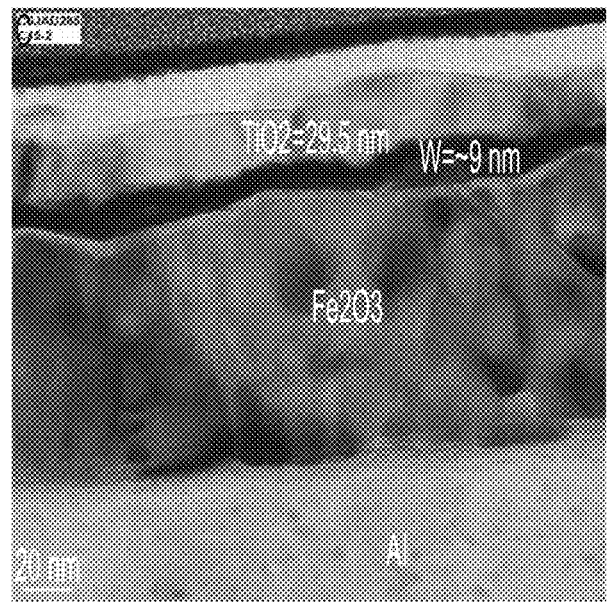
FIG. 8D is a magnified photograph of a multilayer thin film structure according to embodiments disclosed and described herein.

Preparation of a seven layer angle insensitive red reflective color thin film structure is shown in FIG. 8A. over the Al reflective core particle, a dielectric absorber layer like $Fe_2O_3$ is used to improve the angular insensitivity. Commercially available $Fe_2O_3$ coated Al particles may be used as core materials coated with $Fe_2O_3$. A W metal absorber layer and $TiO_2$ outer layer are deposited in sequence over the $Fe_2O_3$ layer to achieve the desired red color via the ALD process developed above. To address the difference between theoretical optical properties and those in actual deposited layer over reflective core particles, a matrix to cover a broad range of W and $TiO_2$ layer thicknesses is provided in FIG. 8B with different cycle numbers. FIG. 8C shows the reflectance spectra of the available samples (highlighted in red color) with different W and $TiO_2$ cycles (thus different layer thickness). FIG. 8C clearly shows the color response towards different layer thickness of $TiO_2$ and W. The increased $TiO_2$ layer thickness would result in a slow right-shift of red peak and the increase of unwanted blue peak. Meanwhile, an increase of W layer thickness can result in a right shift of whole spectra and less reflectance. FIG. 8D shows the cross-sectional image of half stack of one representative flake.

The results in this example show the processes disclosed and described herein are able to deposit both thin layers of metal and metal oxides over reflective core particles (such as Al) with precise thickness control and desired optical properties. It opens up an opportunity to explore new functions of structural color and to bring down the cost of the pigments.

Example 2

Figure 9A:
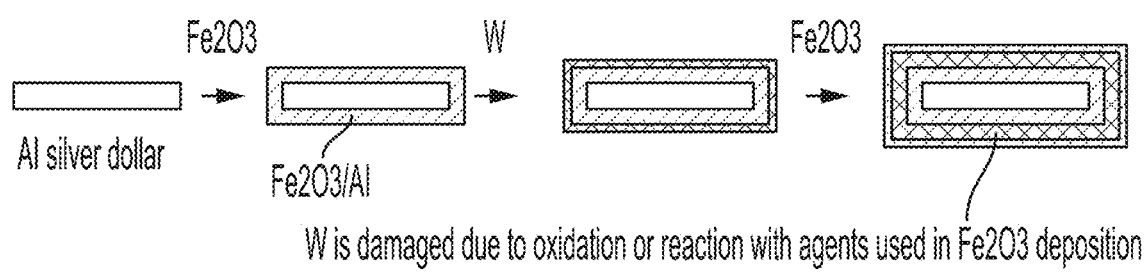
FIG. 9A is a schematic showing processes for forming multilayer thin film structures according to embodiments disclosed and described herein.
Figure 9B:
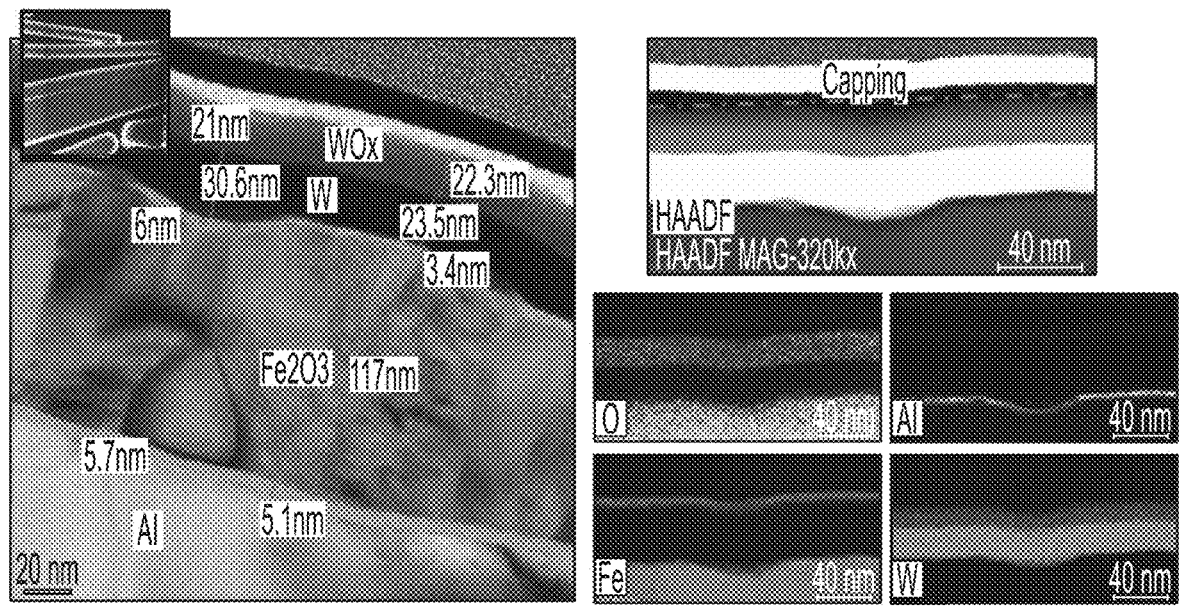
FIG. 9B is a series of magnified photographs of a multilayer thin film structure.
Figure 9C:
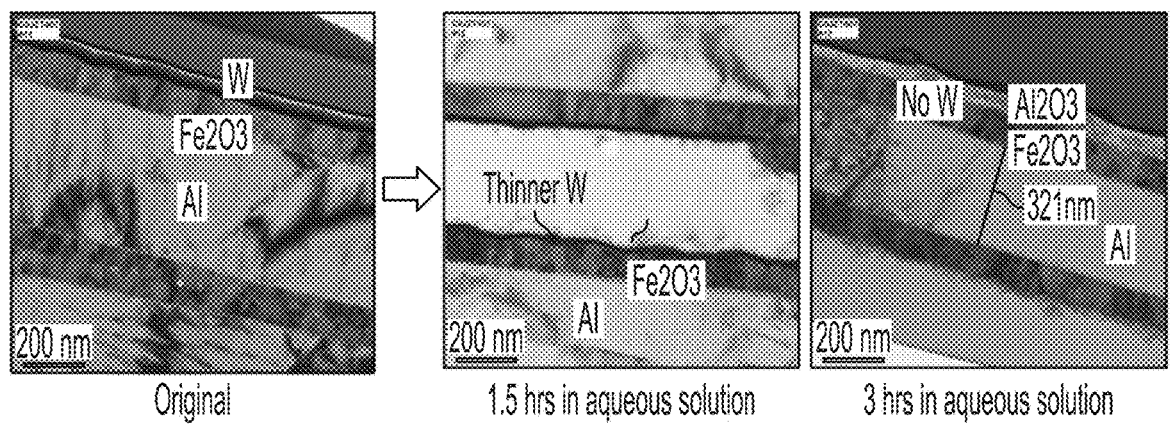
FIG. 9C is a series of magnified photographs of a multilayer thin film structure according to embodiments disclosed and described herein.

A nanoencapsulation method for forming a protective layer according to embodiments is provided. FIG. 9A shows the scheme of a seven layer thin film structure black omnidirectional structural color design that consists of layers of $Fe_2O_3$ and tungsten on Aluminum flakes. In the synthesis scheme, commercially available $Fe_2O_3$ coated Al reflective core particles were obtained and ALD was used to deposit a precise layer of a W absorber directly on the $Fe_2O_3$ coated Al reflective core particle. In one example ALD was also used to deposit an outer layer of $Fe_2O_3$ on the W absorber layer, and in another example CVD is used to deposit an outer layer of $Fe_2O_3$ on the W absorber layer. However, during the $Fe_2O_3$ deposition of the outer layer, either by ALD or CVD the thin W absorber layer was prone to irreversible damage, e.g. subjected to oxidation near tungsten-iron oxide interface during ALD deposition of $Fe_2O_3$ in the presence of oxidative ozone gas as shown in FIG. 9B, or react with acid during wet process as shown in FIG. 9C.

Figure 10A:
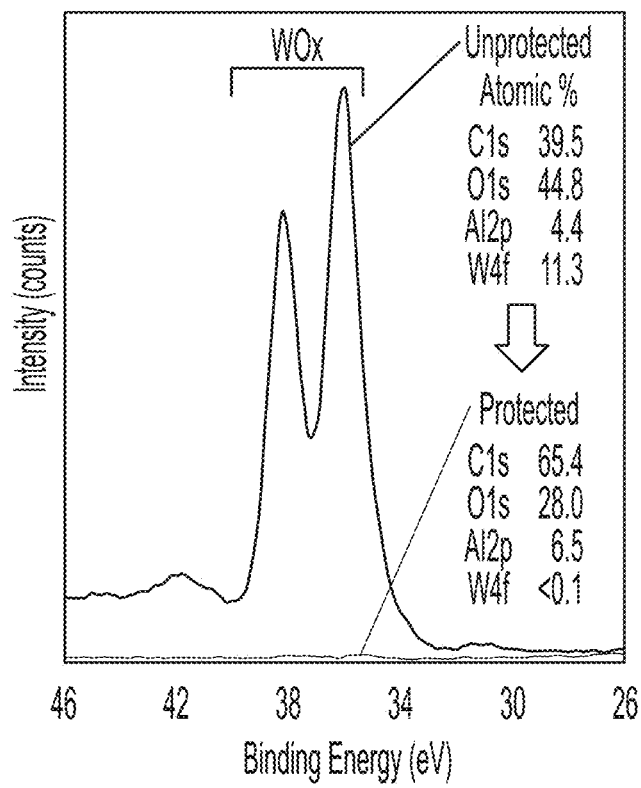
FIG. 10A is a photograph of multilayer thin film structures according to embodiments disclosed and described herein.
Figure 10B:
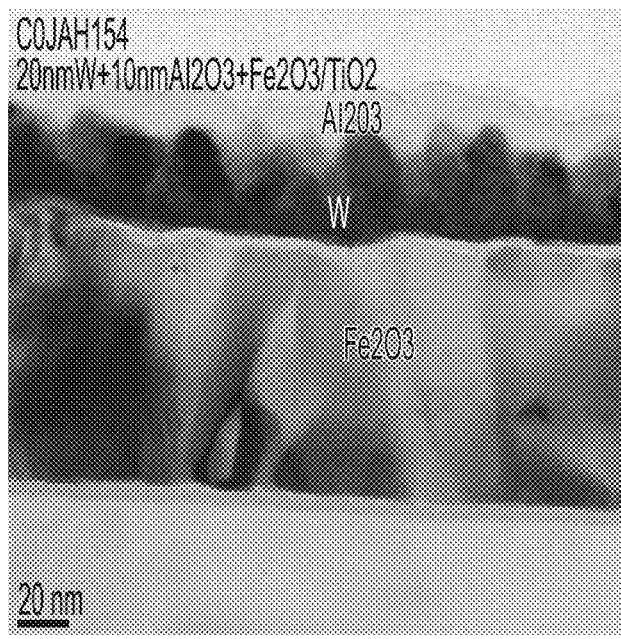
FIG. 10B is a graph showing intensity versus binding energy.
Figure 10C:
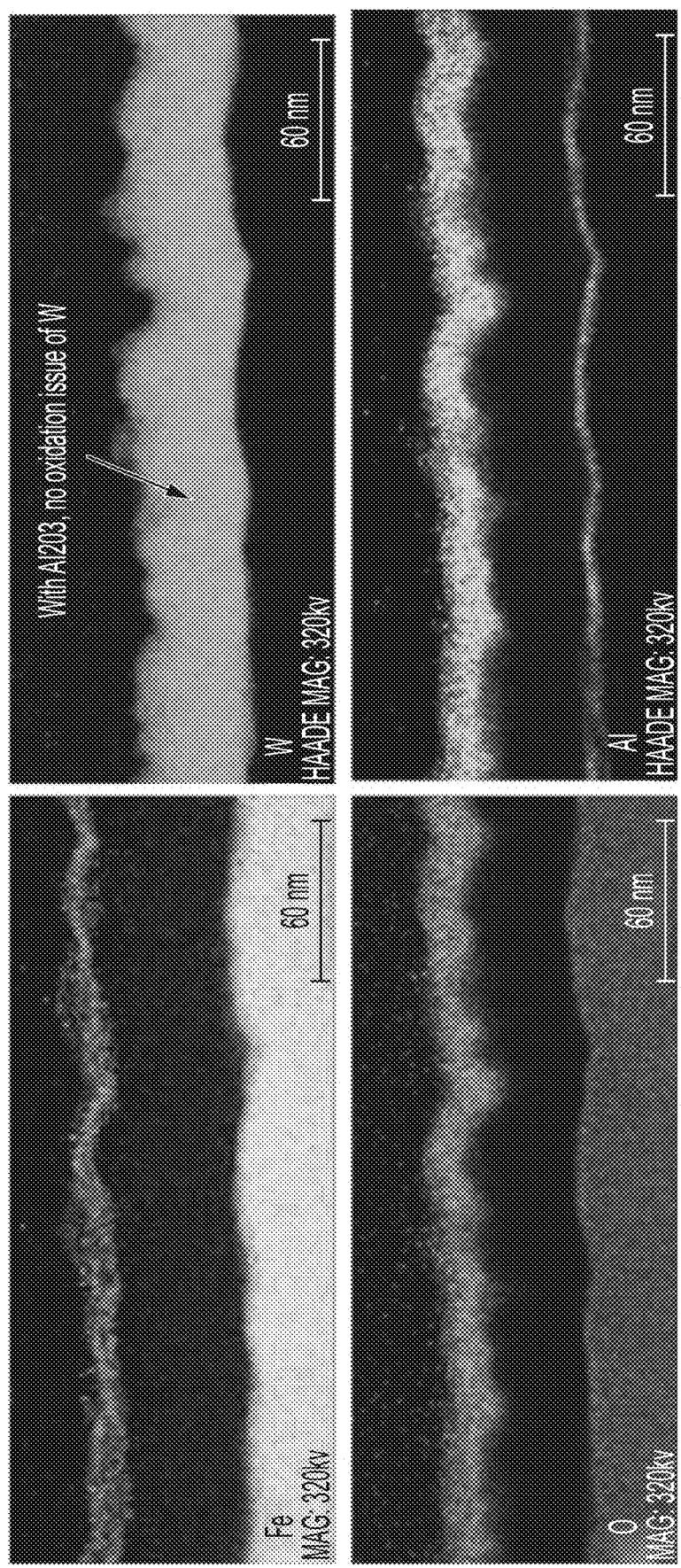
FIG. 10C is a magnified photograph of a multilayer thin film structure according to embodiments disclosed and described herein.

In the gas phase deposition of $Fe_2O_3$, such as CVD and ALD when oxidative agent ozone is normally used, an $Al_2O_3$ protective layer was applied, which is stable in an ozone environment and is easy to be deposited by ALD. Two samples were prepared, one was tungsten coated particles and the other $Al_2O_3$ (about 20 nm thick) encapsulated tungsten coated particles. Both samples were exposed to 700 cycles of ozone dosing, similar as the condition used for iron oxide deposition as shown in FIG. 10A. Surface-sensitive technique X-ray photoelectron spectroscopy (XPS) was used to characterize the samples after test. W 4f XPS spectra clearly shows strong peaks of tungsten oxide in the unprotected sample, while there is no such formation and in the protected sample as shown in FIGS. 10A-10C.

These results show the addition of a thin protective layer is effective to prevent ultrathin tungsten layer from damage during iron oxide deposition. It paves the way for iron oxide deposition to synthesize LIDAR reflective black pigment.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a multilayer thin film structure comprising:
    depositing a dielectric layer to a reflective core particle, wherein the dielectric layer directly encapsulates the reflective core particle, and the dielectric layer is deposited by chemical vapor deposition, atomic layer deposition, physical vapor deposition, or wet chemical processes;
    depositing an absorber layer to the dielectric layer, wherein the absorber layer is deposited by chemical vapor deposition, atomic layer deposition, physical vapor deposition, or wet chemical processes; and
    depositing an outer layer to the absorber layer, wherein the outer layer is deposited by chemical vapor deposition, atomic layer deposition, physical vapor deposition, or wet chemical processes, wherein
    the multilayer thin film structure has a hue shift of less than 30° in the Lab color space when viewed at angles from 0° to 45°; and
    the reflective core particle has a thickness from 10 nm to 5000 nm and a length from 5 μm to 100 μm.

2. The method of claim 1, wherein the absorber layer is deposited by atomic layer deposition.

3. The method of claim 2, wherein the absorber layer has a thickness from greater than 0 nm to 50 nm.

4. The method of claim 3, wherein the absorber layer comprises W, Cr, Ge, Ni, stainless steel, Pd, Ti, Si, V, TiN, Co, Mo, Nb, ferric oxide, amorphous silicon, and combinations thereof.

5. The method of claim 2, wherein the outer layer is deposited by chemical vapor deposition or wet chemical processes.

6. The method of claim 1, wherein the dielectric layer is deposited by chemical vapor deposition or wet chemical processes.

7. The method of claim 1, wherein the reflective core particle comprises Al, Ag, Pt, Sn, Au, Cu, brass, bronze, TIN, Cr, and combination thereof.

8. The method of claim 1, wherein the dielectric layer has a thickness from 5 nm to 500 nm.

9. The method of claim 8, wherein the dielectric layer comprises $Fe_2O_3$, ZnS, $TiO_2$, TiN, $ZrO_2$, $CeO_2$, $HfO_2$, and combinations thereof.

10. The method of claim 1, wherein the outer layer has a thickness from 0.1 quarter wave (QW) to less than or equal to 4.0 QW.

11. The method of claim 10, wherein the outer layer $Fe_2O_3$, ZnS, $TiO_2$, TiN, $ZrO_2$, $CeO_2$, $HfO_2$, and combinations thereof.

12. The method of claim 1, wherein the outer layer is deposited by atomic layer deposition.

13. The method of claim 1, wherein the method further comprises deposing a protective layer to the absorber layer before depositing the outer layer, wherein the protective layer is deposited by chemical vapor deposition, physical vapor deposition, atomic layer deposition, or wet chemical processes.

14. The method of claim 13, wherein the protective layer has a thickness from greater than 0 nm to 50 nm.

15. The method of claim 14, wherein the protective layer comprises $Al_2O_3$ or $SiO_2$.

16. The method of claim 14, wherein the protective layer is deposited by atomic layer deposition.

* * * * *

UNITED STATES PATENT AND TRADEMARK OFFICE
CERTIFICATE OF CORRECTION

PATENT NO. : 12,066,595 B2  
APPLICATION NO. : 17/319369  
DATED : August 20, 2024  
INVENTOR(S) : Songtao Wu and Debasish Banerjee Page 1 of 1

It is certified that error appears in the above-identified patent and that said Letters Patent is hereby corrected as shown below:

In the Specification

In Column 5, Line(s) 51, delete "$u|_{z=0}=1, v=_{z=0}, q_s$" and insert --$u|_{z=0}=1, v|_{z=0}=q_s$--, therefor.

$$q_s = \frac{n_s}{\cos\theta_s} \quad (18)$$

$$q_s = \frac{n}{\cos\theta_F} \quad (19)$$

In Column 6, Line(s) 29, delete " and " and insert --

$$q_s = \frac{n_s}{\cos\theta_s} \quad (18)$$

and $$q_s = \frac{n}{\cos\theta_F} \quad (19)$$

--, therefor.

In the Claims

In Column 16, Line(s) 9, Claim 7, delete "TIN" and insert --TiN--, therefor.

In Column 15, Line(s) 33, Claim 4, delete "TIN" and insert --TiN--, therefor.

Signed and Sealed this  
First Day of October, 2024

Katherine Kelly Vidal  
*Director of the United States Patent and Trademark Office*